May 10, 1927.

M. H. KERN 1,628,153

AUTOMOBILE HEADLIGHT

Filed Sept. 19, 1925

2 Sheets-Sheet 1

Inventor

Mason H. Kern

By *(signature)*

Attorney

May 10, 1927.

M. H. KERN 1,628,153

AUTOMOBILE HEADLIGHT

Filed Sept. 19. 1925    2 Sheets-Sheet 2

Inventor
Mason H. Kern
By Faust F. Crampton
Attorney

Patented May 10, 1927.

1,628,153

UNITED STATES PATENT OFFICE.

MASON H. KERN, OF TOLEDO, OHIO.

AUTOMOBILE HEADLIGHT.

Application filed September 19, 1925. Serial No. 57,402.

My invention has for its object to provide an automobile head-light reflector which is so supported that it may be turned to place the lens in substantially vertical or in horizontal positions and thus direct rays of light along substantially horizontal or vertical lines or to any intermediate angle with respect to the horizontal or vertical, means being provided for reflecting and directing a large portion of the rays of light forward to light the road and so that no rays of light will rise above the level of the edge of the shell when the lens is placed in a horizontal position.

In the preferred form of the invention the lens of each lamp is formed of a relative thin glass, prominently convex, on the exterior of the lamp and a main substantially parabolic reflector is located within the shell of the lamp, the axis of the shell and the reflector being substantially coincident and the lens being located substantially at right angles to the axis of the shell, and an auxiliary reflector, spherical or substantially parabolic, in form is located so that its axis approximates 90 degrees to the axis of the shell.

The invention may be contained in lamps of different forms and used for a variety of purposes. To illustrate a practical application of the invention I have selected a structure containing the invention as an example of such structures and shall describe it hereinafter. The lamp selected for purposes of illustration is shown in the accompanying drawing.

Figure 1:
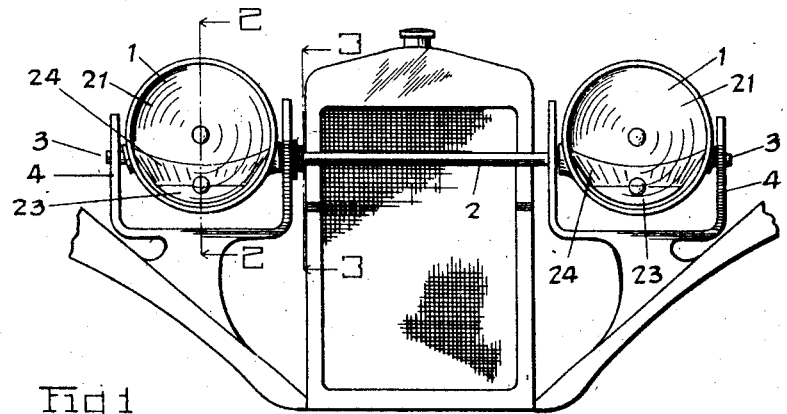
Figure 2:
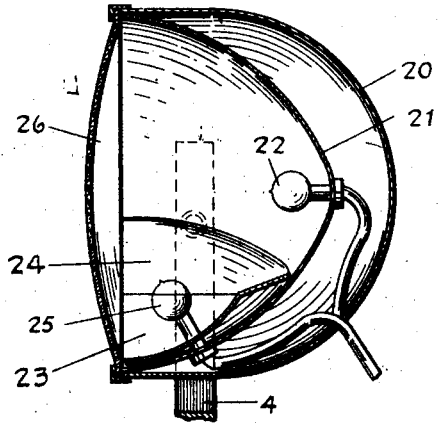
Figure 3:
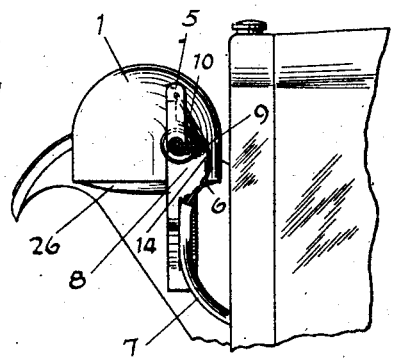
Figure 4:
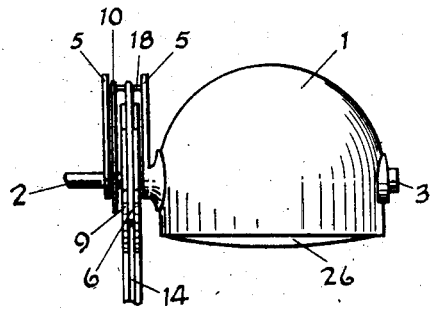
Figure 5:
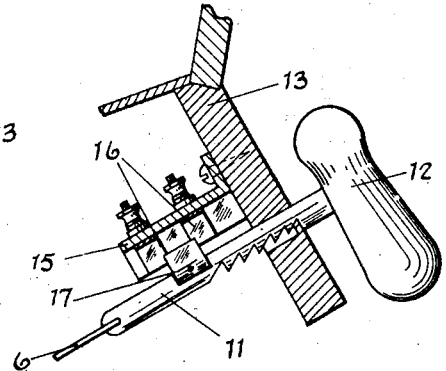
Figure 6:
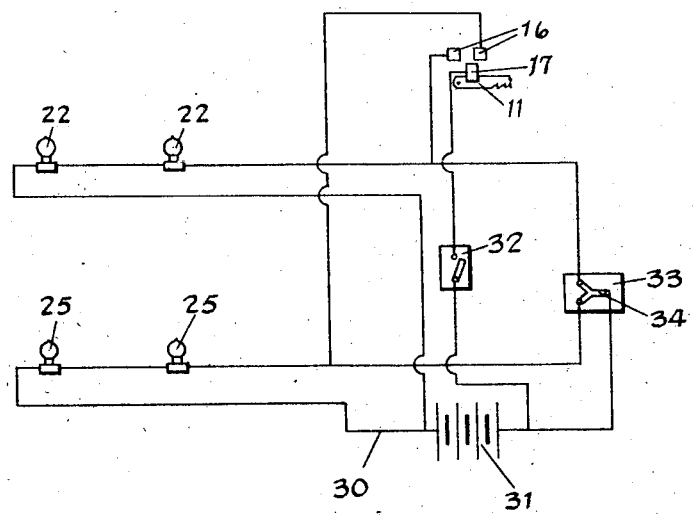

Figure 1 illustrates a front view of an automobile having mounted thereon a pair of automobile head-lights containing my invention. Fig. 2 is a vertical section taken on the plane of the line 2—2 indicated in Fig. 1. Fig. 3 is a view of a section taken on the plane of the line 3—3 indicated in Fig. 1. Fig. 4 is a rear view of one of the lamps and the devices used in rotating it to its vertical and horizontal positions. Fig. 5 illustrates the switch which may be used for changing the electric connections when a change in the relative position of the lamp is made. Fig. 6 illustrates a system of electrical connections that may be used in conjunction with the form of invention shown in Fig. 1 to 5 inclusive.

The head lamps embodying my invention and shown in the drawings are so supported that they may be turned on a horizontal axis extending, preferably, across the front of the radiator of the automobile. The lamps 1 may be connected to the rod 2 and the pins 3 which are rotatably supported in suitable brackets, such as, the brackets 4. A pair of arms 5 one being connected to the rod 2 and the other to the lamp 1 have a pin 18 passing through and secured at the ends of the arms 5 to which a wire 6 such as steel wire is connected for the purpose of rotating the rod 2 and causing rotation of the lamps 1. The wire 6 is confined within a metal tube 7 whereby the wire 6 may be located along any suitable line between the arm 5 and a handle that may be located conveniently for operation by the automobile driver. Thus the wire 6 and the tube 7 may extend down towards and along the frame of the automobile or along the engine base. One of the brackets 4 may be provided with an enlarged portion 8 having a curved edge 9 in which is formed a groove 14 in which the wire 6 may be located. This prevents the wire 6 being placed substantially along a dead center line with respect to its connection with the arms 5 and so that when the wire 6 is pulled it will rotate or oscillate the arms 5. The reverse movement of the lamps 1 may be obtained by means of a spring 10 that is secured to the bracket 4 at one end and to the pin 18 at the other end. This will operate to elastically move the arms 5 and cooperate in the rotation of the lamps 1 when the wire 6 is bodily moved forwardly to locate the lamps in such positions that their lenses will be placed horizontally. The wire 6 being confined by the tube 7 will also cooperate with the spring 10 to move the lamps 1 such that their lenses will be placed in horizontal positions. Any suitable means may be provided for securing the lamps in any desired adjusted positions, such as, the ratchet bar 11 which is provided with a handle 12, and may be supported in the instrument board 13.

The shell 20 of the lamp may be dome shape and within the shell is located a reflector 21, preferably, parabolic in form. The reflector 21 has its axis coincident with the axis of the dome shaped shell 20. A lamp 22 is located substantially within the focus of the reflector 21 or in such a position that the rays of light that are reflected from the reflector 21 will be projected in parallel lines. At the lower part of the reflector 21 is located a concave reflector 23 which may be a segment of a sphere having its center substantially within the plane of the edge of the shell 20 and the reflector 21. The reflector 23 may be substantially parabolic if desired. In order that the space between the edge of the reflector 23 and the lower part of the reflector 21 may be covered by a reflecting surface, a reflector strip, or filler 24, formed of polished metal may be fitted between the edge of the reflector 23 and the lower part of the reflector 21. The reflector's strip or filler 24 will operate to reflect the rays of light towards the upper edge of the reflector 21. A bulb 25 is located at a point between the axis of the reflector 23 and its edge. The light of the lamp 25 will be reflected towards the opposite edge portion of the lens 26. Thus when the lamp is located in the position shown in Figs. 1 and 2 the light of the bulb 22 will be directed forward for a long distance. If desired, at this time, the circuit of the bulb 25 may be opened. When however, the lamp is tilted to the position shown in Fig. 3 the bulb 25 is lighted and the light is directed towards the forward edge of the shell 20 and the lamp 25 and the reflector 23 and the part 24 will be completely covered so that the direct rays of light will not reach the eyes of the operator of an approaching automobile. In order that the rays of light from the lamp 20 and its reflector may be efficiently directed forwardly, and lens of the lamp is formed of thin sheet glass 26 and is made of uniform thickness and prominently convex on the exterior of the lamp. The lens thus formed is used in place of a refractive lens that would direct a large part of the rays along the axis, either converging or diverging and prevent the rays from being projected along lines outside of the lamp and that extend from the reflector 23 the filler 24 and the lamp 25 towards the opposite edge portion of the lens. By this arrangement, I have provided an exceedingly efficient lamp for night travel which will prevent the blinding of drivers of approaching automobiles.

In the form of construction shown in Figs. 1 to 4 it is preferable to change the connections from one lamp to the other when the change in the position of the lamp is made, and in order that this may be done, I have provided a switch for switching the light from one lamp to the other when the handle 12 is drawn to make the change in position.

A bracket 15 is secured to the back of the instrument board 13 and a pair of contacts 16 may be insulatingly supported on the bracket 15. Also a contact 17 may be insulatingly supported on the rack 11 and so that when the rack 11 is shifted to change the position of the lamp, connection will be made through one or the other of the contacts 16 which are connected to one or the other pair of electric bulbs, the electric bulbs of each pair being located in the same relative position in the lamps. As indicated in the diagram shown in Fig. 6 the bulbs 22 are connected to one contact 16 while the bulbs 25 are connected to the other contact 16. The bulbs may have a common return 30 through the battery 31. A switch 32 may be provided for connecting the battery to the contact 17 which is the controlling contact with reference to the bulbs 22 on the one hand, and the bulbs 25 on the other. If it is desired to maintain the bulbs 22 and 25 lighted they may be connected to a switch 33 having a double contact switch arm 34 for completing the circuits, one through the bulb 22 and the other through the bulb 25 in the parallel or for opening this parallel relation of the circuits. When the switch 34 is closed the bulb will be lighted independent of the operation of the handle 12 and when the switch 34 is open the lighting of the bulbs will be dependent on the position of the handle 12 and consequently on the position of the lamps 1.

I claim:

In an automobile lamp, a shell, means for turning the shell for moving its upper edge portion towards and away from the road, a main reflector located in the shell and having its axis coincident to the axis of the shell, a main electric bulb located substantially in the axis of the main reflector, a thin convex lens of uniform thickness located substantially at right angles to the axis of the shell, an auxiliary reflector located so that its axis is located substantially in the plane of the edge of the lamps, and a secondary bulb located in front of the auxiliary reflector and below the axis of the shell, a source of current and means whereby the circuit is switched from the main bulb to the secondary bulb upon tilting the shell.

In testimony whereof I have hereunto signed my name to this specification.

MASON H. KERN.